Aug. 17, 1937.  L. G. FRISE  2,090,036
RETRACTABLE LANDING GEAR FOR AIRCRAFT
Filed Aug. 12, 1936  2 Sheets-Sheet 1
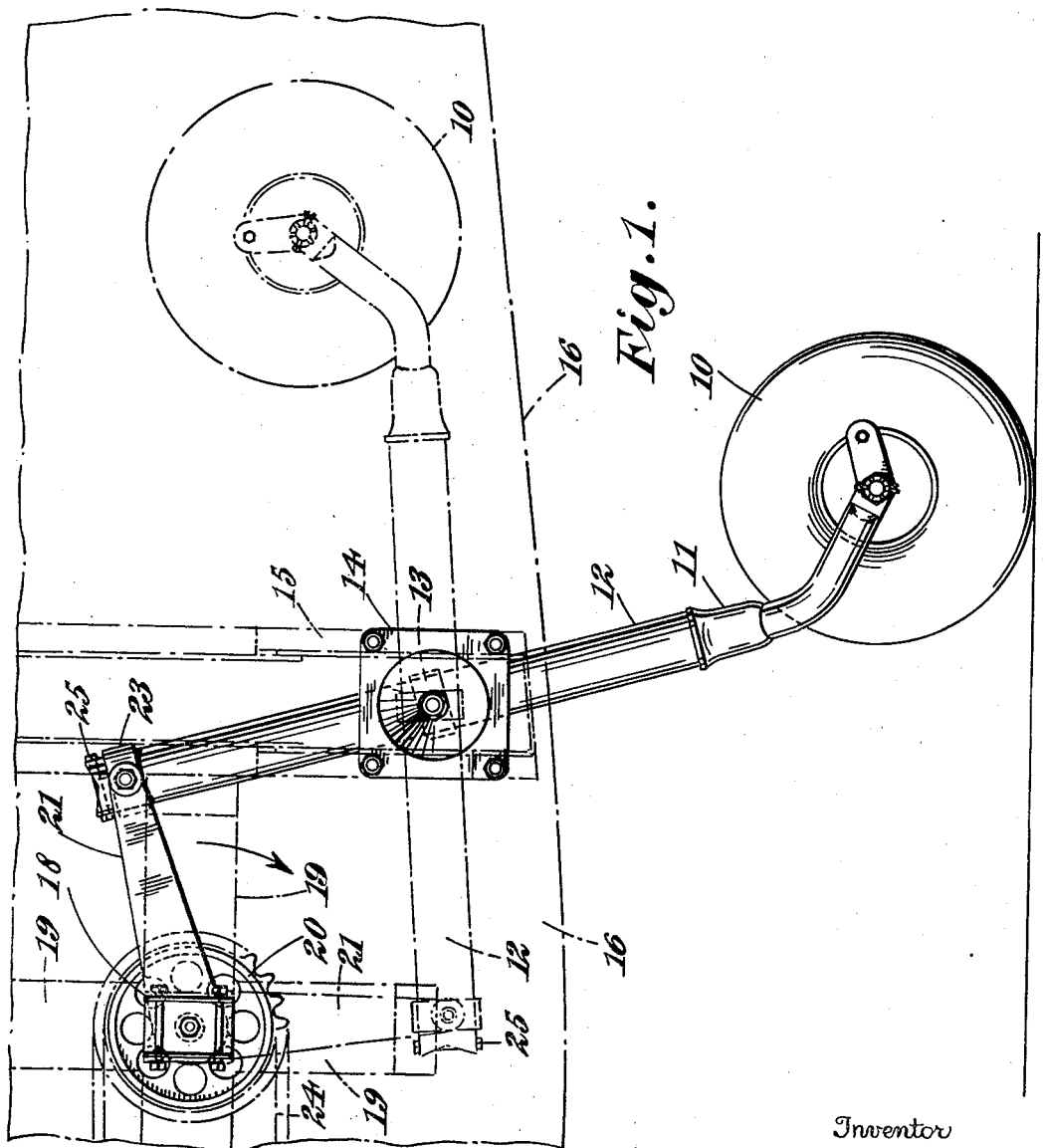
Inventor
LESLIE GEORGE FRISE
By
Wilkinson & Mawhinney
Attorneys,

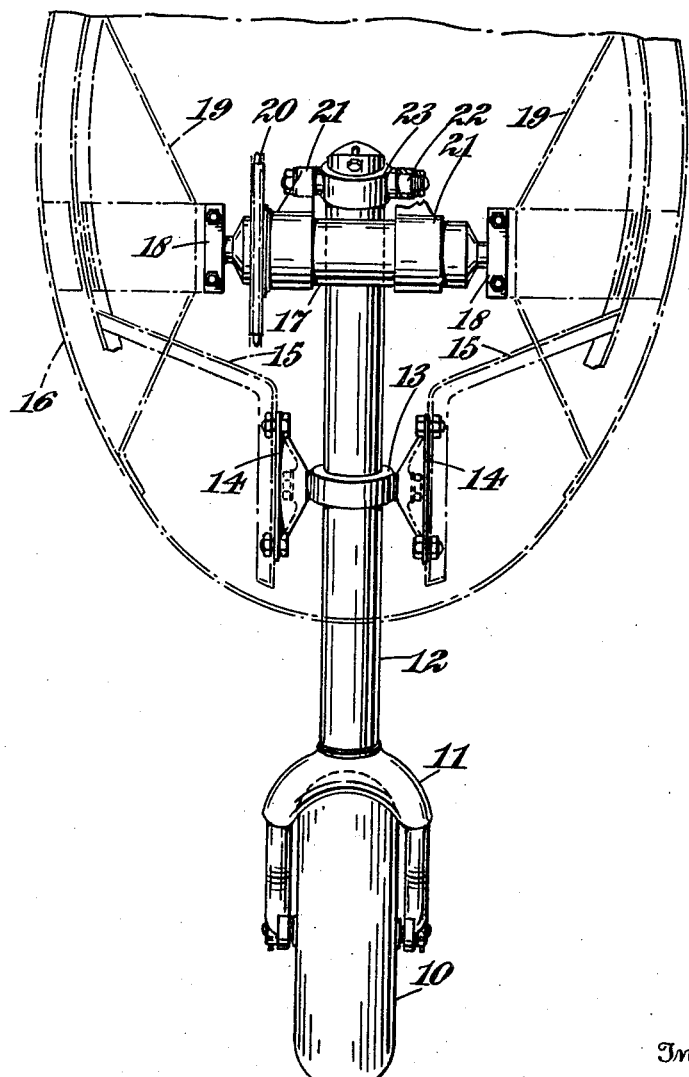

Patented Aug. 17, 1937

2,090,036

UNITED STATES PATENT OFFICE 2,090,036

RETRACTABLE LANDING GEAR FOR AIRCRAFT

Leslie George Frise, Bristol, England, assignor to The Bristol Aeroplane Company, Limited, Bristol, England, a British company Application August 12, 1936, Serial No. 95,670
In Great Britain November 4, 1935

5 Claims. (Cl. 244—102)

This invention is for improvements in retractable gear for aircraft and, while it is primarily applicable to the tail-wheels of aeroplanes, it may also be applied to the main landing wheels or to other apparatus, such as the wireless mast, which needs to be retracted wholly or partly within a stream-lined structure such as an aeroplane wing. The object of the invention is to provide an arrangement of such retractable gear in which the external forces on the wheel or other apparatus are efficiently accommodated.

The invention makes use of a mechanism, herein termed "slider-and-crank" mechanism, which consists essentially of a crank rotatable about a fixed axis and engaging at its end with a link rotatable about another fixed axis, the axes being spaced apart by a distance greater than the length of the crank; the point of engagement of the end of the crank with the link is movable lengthwise of the link, the effective length of which is therefore variable according to the angle between it and the crank, whereas the length of the crank is constant.

It is a fundamental property of such a mechanism that it is non-reversible in certain positions, viz. when the crank and link are at right-angles to one another and the crank is therefore in a "dead-centre" position. That is to say, when the parts are in this position a rotational force on the crank will rotate the link but it is impossible to rotate the crank by applying force to the link.

According to the present invention, retractable gear for aircraft comprises a slider-and-crank mechanism whereof the "crank" is driven by the actuating or controlling mechanism and the "link" is connected to the wheel or other apparatus to be retracted, wherein the retracted and extended positions of the apparatus correspond or approximately correspond respectively to dead-centre positions of the "crank" so that external forces on the apparatus in its fully extended or fully retracted positions have no tendency to rotate the "crank".

In a constructional form of the invention the landing wheel or other apparatus is carried on a bar (which constitutes the "link" aforesaid) pivoted about a fixed axis; an arm to which operating force is applied is arranged to rotate about another fixed axis and carries a sleeve rotatable about an axis parallel with the fixed axes aforesaid and slidable along the said bar. The arm is preferably forked or formed in two portions to form bearings for trunnions on the sleeve and the bar is preferably pivoted at a point between the wheel and the part engaged by the sleeve.

Where the invention is applied to a retractable tail-wheel gear for an aeroplane the gear may be interconnected with the retractable gear of the main landing wheels so as to be actuated thereby. For this purpose the arm may be mounted on the shaft of a sprocket-wheel driven by a chain from the main landing-wheel gear.

A specific embodiment of the invention will now be described with reference to the accompanying drawings, in which:—

Figure 1 is an elevation of retractable gear for the tail-wheel of an aeroplane, and Figure 2 is an elevation at right-angles to that of Figure 1.

As shown in the drawings, the wheel 10 is carried in a fork 11 which is attached to the lower end of a bar or tube 12. If desired, shock-absorbing means may be provided between the fork 11 and the tube 12.

Permanently affixed to the tube 12 is a collar 13 mounted so as to be rotatable in bearings formed by brackets 14 attached to frame-members 15 which are secured in any desired manner to the fuselage 16 of the aeroplane.

At a point forward of the brackets 14 and higher up in the fuselage is a tubular shaft 17 mounted in bearings 18 which are also secured to the fuselage by brackets 19, as shown. The shaft 17 carries at one end a chain sprocket 20 and it also carries two arms 21 rigidly secured to it. At the outer ends of the arms they are formed with bearings for trunnion members 22 of a sleeve or collar which is slidable on the wheel-tube 12. One of the bearings is shown in section in Figure 2, for the sake of clearness.

In their extended position the wheel and associated parts assume the position shown in full lines in Figure 1. In this position it will be seen that the arms 21 are at right-angles to the tube 12 so that any forces on the wheel are absorbed either in the bearings 14 or in the bearings 18. There is no component tending to rotate the sprocket wheel 20 because the arms 21 (which constitute the "crank" hereinbefore referred to) are in their dead-centre position. When it is required to retract the wheel the chain 24 is driven so that the sprocket 20 rotates in the direction of the arrow in Figure 1. As a result, the sleeve 23 travels down the wheel-tube 12, causing it to rock about the bearings 14. Continued rotation of the sprocket moves the parts into the position shown in dotted lines in Figure 1 in which, it will be seen, the arms 21 are again substantially at right-angles to the wheel-tube 12, so that inertia forces on the wheel and associated parts have no tendency to rotate the sprocket 20.

A bolt 25 may be provided in the end of the wheel-tube 12 to limit the travel of the sleeve 23 along it, and the position of this bolt is such that the arms 21, in the two positions shown, are either at their dead-centres or slightly beyond them, so that the mechanism is non-reversible, as hereinbefore described.

The chain 24 is preferably interconnected with the retractable gear for the main landing-wheels of the aeroplane, so that the wheel 10 is automatically retracted or extended when the gear for the main wheels is operated.

The mechanism described above could be modified in various ways without departing from the scope of the invention. For example, the arms 21 may be replaced by a wheel carrying the sleeve 23 at a point on its circumference. Alternatively, the arms could be formed with a pin to engage with a slot formed longitudinally in the member 12.

Also the invention may be applied to the retractable gear for front or main wheels, or to other apparatus, where convenient.

I claim:—

1. Retractable gear for aircraft comprising, in combination, a wheel or other apparatus to be retracted, actuating or controlling mechanism for retracting said wheel, slider-and-crank mechanism interconnecting said actuating mechanism with said apparatus to be retracted, wherein both the retracted and extended positions of the apparatus substantially correspond to dead-centre positions of the crank.

2. Retractable gear for aircraft comprising a bar pivoted about a fixed axis and carrying the wheel or other apparatus to be retracted, an arm rotatable about another fixed axis and a sleeve pivotally mounted on the arm and slidable on the bar, wherein both the retracted and extended positions of the bar substantially correspond to the dead-centre positions of the arm.

3. Retractable gear for aircraft comprising a bar pivoted about a fixed axis and carrying the apparatus to be retracted, a forked arm rotatable about another fixed axis, a sleeve having trunnions engaging the forked portion of the said arm so as to be pivotally mounted on the said arm and slidable on the bar, wherein the retracted and extended positions of the bar substantially correspond to dead centre positions of the arm.

4. Retractable gear for the tail-wheel of an aeroplane, comprising a chain sprocket driven from the retractable gear of the main landing wheels of the aeroplane, a tail-wheel mounted on a pivoted member and slider-and-crank mechanism interconnecting said chain sprocket with said pivoted member, wherein the crank of the slot-and-crank mechanism is connected to the chain sprocket and the link of the slider-and-crank mechanism is constituted by said pivoted member.

5. Retractable gear according to claim 4, comprising an abutment on the pivoted member to limit the movement of the crank along it.

LESLIE GEORGE FRISE.